United States Patent
Nitschke et al.

(10) Patent No.: US 6,463,555 B2
(45) Date of Patent: *Oct. 8, 2002

(54) WATCHDOG CIRCUIT

(75) Inventors: Werner Nitschke, Ditzingen; Wolfgang Drobny, Heilbronn; Otto Karl, Leonberg-Hoeflingen, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,777
(22) PCT Filed: Nov. 12, 1997
(86) PCT No.: PCT/DE97/02645
§ 371 (c)(1), (2), (4) Date: Sep. 23, 1999
(87) PCT Pub. No.: WO98/43164
PCT Pub. Date: Oct. 1, 1998

(65) Prior Publication Data
US 2002/0124212 A1 Sep. 5, 2002

(30) Foreign Application Priority Data
Mar. 24, 1997 (DE) .......................................... 197 12 375

(51) Int. Cl.[7] ................................................. G06F 11/30
(52) U.S. Cl. ......................................................... 714/55
(58) Field of Search ............................. 714/55, 56, 51, 714/23

(56) References Cited

U.S. PATENT DOCUMENTS 5,048,017 A * 9/1991 Breneman ..................... 714/55
5,699,511 A * 12/1997 Porcaro et al. ............. 709/224

FOREIGN PATENT DOCUMENTS

| DE | 3320587 A1 | * 12/1984 | ........... G06F/11/30 |
| EP | 0 403 396 A1 | * 12/1990 | ........... G06F/11/00 |
| EP | 0 479 806 B1 | 4/1994 | |

OTHER PUBLICATIONS

Hill et al., "Mikrocomputer in Kfz–Anwendungen", Feb. 17, 1989, Elektronik, pp. 48–51 and 54–56.*

* cited by examiner

*Primary Examiner*—Scott Baderman
(74) *Attorney, Agent, or Firm*—Michael J. Striker

(57) ABSTRACT

A watchdog circuit (WD) monitors the function of the processor (MC) in that the processor (MC) outputs a cyclically repeating test signal to the watchdog circuit (WD), and the watchdog circuit (WD) generates a reset signal (RST) for the processor (MC) if the test signal (WDS) does not appear in a time slot (S1, S2) specified by the watchdog circuit (WD). The width of the time slot (S1, S2) can be increased in the starting phase of a program sequence of the processor (MC).

4 Claims, 1 Drawing Sheet

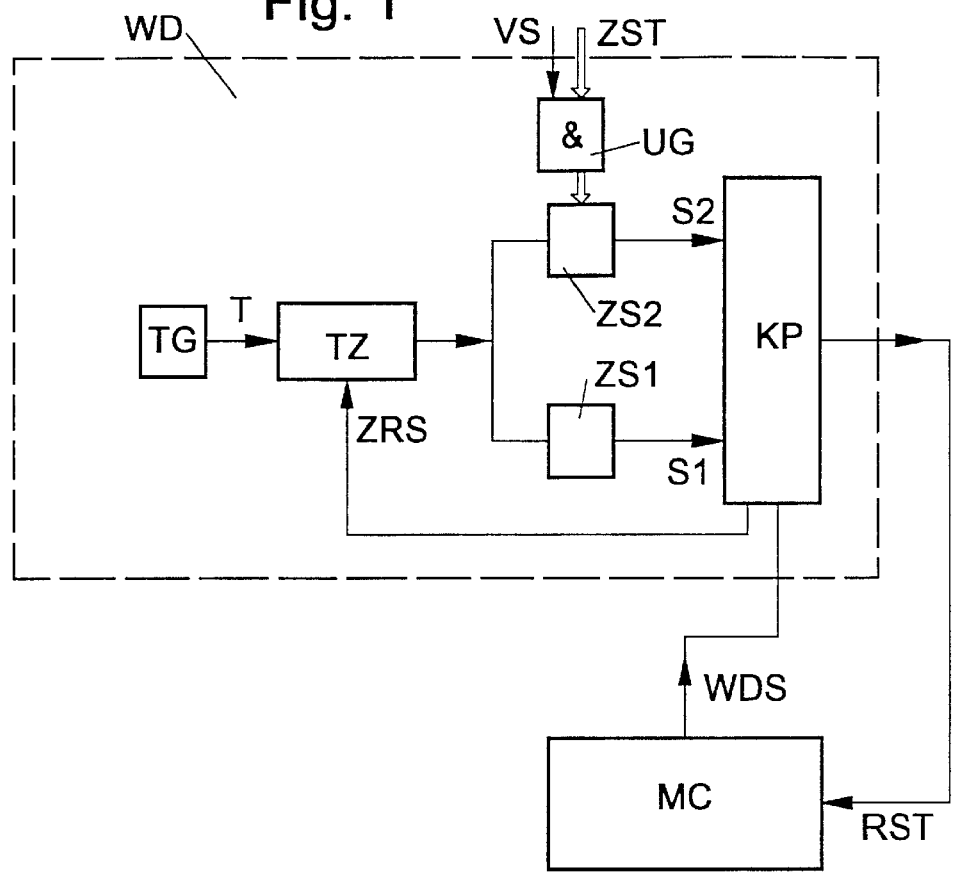
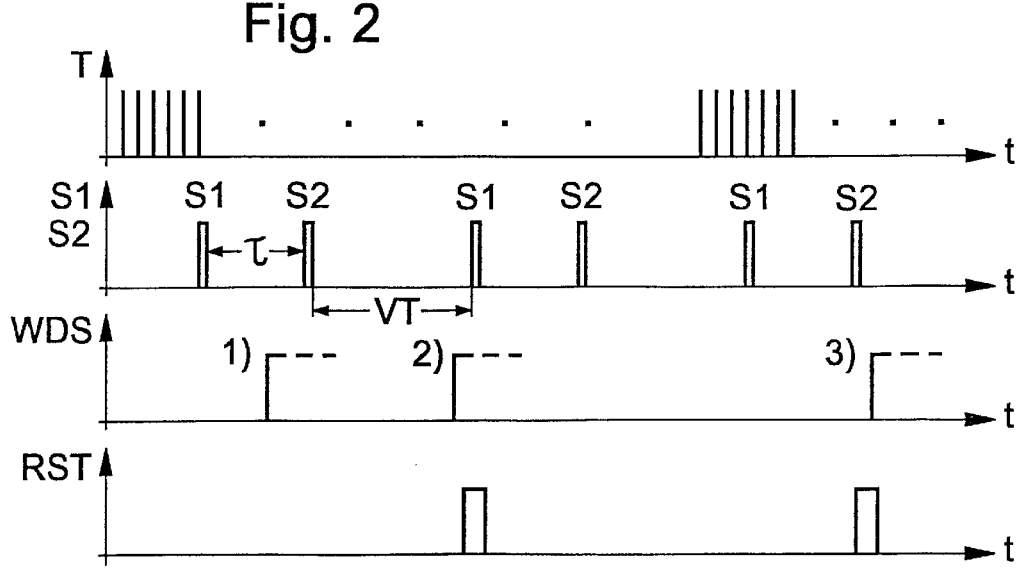

WATCHDOG CIRCUIT

BACKGROUND OF THE INVENTION

The present invention relates to a watchdog circuit for monitoring the function of a processor, in which the processor outputs a cyclically repeating test signal to the watchdog circuit, and the watchdog circuit generates a reset signal for the processor if the test signal does not appear in a time slot specified by the watchdog circuit.

This kind of slot watchdog is described for instance in DE 33 20 587 A1 or EP 0 479 806 B1. From these references it is known to use watchdog circuits, for instance for microprocessors that monitor the processor program sequence. If the program sequence is correct, the microprocessor at certain time intervals triggers the watchdog circuit with a test signal. If this test signal appears in the time slots specified by the watchdog circuit, then the program sequence of the microprocessor is continued unhindered. If an error occurs in the microprocessor, however, for instance as a result of interruption of the program sequence, then the microprocessor does not send its test signal to the watchdog circuit within the specified time slot. This causes the watchdog circuit to output a reset signal, which resets the microprocessor to the program start and/or signals an error function of the microprocessor.

From Elektronik, Vol. 38, No. 4, Feb. 17, 1988, pages 48 to 51 and 54 through 56, a watchdog circuit is known whose time slot is variable in width, so that the monitoring periods for the connecting processor can be adapted to the applicable program portion or processor operating mode (transfer mode, hold mode, read mode, or standby mode).

SUMMARY OF THE INVENTION

In accordance with the present invention, the time slot specified by the watchdog circuit, within which the test signal of the processor to be monitored should appear, is controllable in its width. Expediently, the time slot is widened precisely in the starting phase of the program sequence of the processor. Experience teaches that the microprocessor, in the starting phase of its program sequence, does not yet reach the desired exact time matrix for the test signal, and so if a narrow time slot is specified the watchdog circuit signals an error function in the program sequence more often to the processor, by outputting a reset signal. Restarting of the program sequence would then occur more often, even though actually there is no error function in the program sequence. By widening the time slot in the watchdog circuit, greater play for starting up is given to the program sequence in the starting phase. As soon as the starting phase is finished and the program sequence has reached its steady state, the time slot is returned to its original width again. For varying the width of the time slot, only its upper limit needs to be controllable.

BRIEF DESCRIPTION OF THE DRAWINGS

FIG. 1, a block circuit diagram for a watchdog circuit, and

FIG. 2, a timing diagram that describes the function of the watchdog circuit.

DESCRIPTION OF PREFERRED EMBODIMENTS

FIG. 1 shows the block circuit diagram of a watchdog circuit WD, which is connected to a processor MC—such as a microprocessor, microcomputer, microcontroller, or the like. This watchdog circuit WD serves to monitor the function of the processor MC.

The watchdog circuit WD includes a clock generator TG, which generates a clock signal T as a specified clock frequency and delivers it to a clock counter TZ. The timing diagram in FIG. 2 shows the clock signal T. The output signal of the clock counter TZ is delivered to two circuit blocks ZS1 and ZS2, of which circuit block ZS1 specifies a first counter threshold and circuit block ZS2 specifies a second counter threshold. If the counter state corresponds to the lower counter threshold stored in circuit block ZS1, then a pulse S1 is output, and if the counter state corresponds to the upper counter threshold specified in circuit block ZS2, then the pulse S2 is generated. As the timing diagram in FIG. 2 clearly shows, the two pulses S1 and S2, by their mutual chronological spacing, form a time slot. At periodic intervals vt, a new time slot of width is specified again and again by the two pulses S1 and S2.

A comparator circuit KP is informed about the beginning and end of the time slot, in the form of the two pulses S1 and S2. This comparator circuit KP also receives a test signal WDS output by the processor MC. The comparator circuit KP now compares the time of arrival of the test signal WDS in relation to the arrival of the pulses S1 and S2 that define the time slot. If the test signal WDS of the processor MC occurs after the first pulse S1 and before the second pulse S2 of the time slot, then as indicated by case 1) in the timing diagram of FIG. 2, the processor MC is operating without error. However, if the test signal WDS in case 2) appears before the lower threshold S1 of the time slot or as in case 3) after the upper threshold S2 of the time slot then an error function of the processor MC is occurring. In these last two cases 2) and 3), the comparator circuit KP outputs a reset signal RST to the processor MC, so that the program sequence of the processor can be restarted, and/or the error function is signaled in some arbitrary way. The reset signals RST for the two error cases 2) and 3) are shown in FIG. 2. In error case 2), the reset signal RST is output immediately after the overly early test signal WDS. In error case 3), the reset signal RST is output by the comparator circuit KP after the pulse S2 for the upper threshold of the time slot, namely whenever it is certain that the test signal WDS of the processor MC has not appeared within the time slot.

After the test signal WDS has correctly appeared in the time slot or after the reset signal RST, the comparator circuit KP generates a reset signal ZRS for the clock counter TZ. This counter then begins to count over again from the beginning. After a delay period VT, which corresponds to the interval between time slots, the first counter threshold is reached, which trips the pulse S1 for the beginning of a new time slot.

FIG. 1 shows that a control signal ZST is delivered to the circuit block ZS2 for the upper threshold of the time slot, with which signal the upper threshold, that is, the width of the time slot can be changed. As noted at the outset, it is expedient upon a program start of the processor MC to widen the time slot, so that the program in the starting phase will have greater freedom to start up. After the starting phase, the time slot is restored to its original width. The control signal ZST for the time slot is advantageously furnished by the processor MC. The width of the time slot can either, as described, be effected by shifting the upper threshold of the time slot, by shifting the lower threshold, or by shifting both thresholds. After a reset of the processor MC, the clock counter TZ is also restarted with the reset signal ZRS. The control signal ZST for the time slot is delivered to the circuit block ZS2 via an AND gate UG. A locking signal VS is applied to a second input of the end gate UG. Only if the locking signal has the state "1" can the time slot be varied. If the locking signal has state "0", no change in the time slot is possible. It can thus be assured that the time slot can no longer be varied once the program start has been completed.

Generating the time slot with the chronological location of the test signal of the processor can be done in any other way, in a departure from the exemplary embodiment described above. From the standpoint of the invention, it is essential that the time slot be increased during the starting phase of a program sequence.

What is claimed is:

1. A watchdog circuit for monitoring a function of a processor in which a processor outputs a cyclically repeated test signal to a watchdog circuit, said watchdog circuit being formed so that it generates a reset signal for the processor if the test signal does not appear in a time slot specified by the watchdog circuit with a width of the slot being controllable, the watchdog circuit being formed so that it widens the time slot if a program sequence is started in the processor and reduces the width of the slot after a termination of a starting phase.

2. A watchdog circuit as defined in claim 4, wherein the time slot has an upper limit which is controllable.

3. A method of monitoring a function of a processor, comprising the steps of outputting by the processor a cyclically repeating test signal to a watchdog circuit; generating by the watchdog circuit a reset signal for the processor if the test signal does not appear in a time slot specified by the watchdog circuit; controlling a width of the time slot; widening the time slot by the watchdog circuit if a program sequence is started in the processor; and reducing the width of the time slot after a termination of a starting phase.

4. A method as defined in claim 3: and further comprising the step of controlling an upper limit of the time slot.

* * * * *